UNITED STATES PATENT OFFICE.

HENRY N. FRENTRESS, OF DUNLEITH, ILLINOIS.

IMPROVEMENT IN WIRE-FENCE BARBS.

Specification forming part of Letters Patent No. 171,008, dated December 14, 1875; Reissue No. 7,697, dated May 22, 1877; application filed March 30, 1877.

DIVISION A.

*To all whom it may concern:*

Be it known that I, HENRY N. FRENTRESS, of Dunleith, in the county of Jo Daviess and State of Illinois, have invented a new and useful Improvement in Barbed-Wire Fences, of which the following is a specification.

In the accompanying drawing, forming a part of this specification, Figure 1 is a front view of one of my improved barbs, shown as applied to a wire cord. Fig. 2 is a side view of the same, the wire cord being shown in cross-section. Fig. 3 is a plan view of one of the barbs after being cut out and before being bent.

Similar letters of reference indicate corresponding parts.

The object of this invention is to furnish improved barbs for wire fence, which shall be simple in construction, inexpensive in manufacture, and reliable in use, keeping their places securely; and it consists in the barbs formed by cutting thin sheet metal into diamond form, slitting them from the acute angles nearly to the center, and bending the prongs at each end at an angle with each other, to adapt them to be twisted into a two-strand wire cord, as hereinafter fully described.

In said drawing, A represents one of my improved barbs, which is made of thin sheet-steel or other suitable sheet metal. The barbs A are cut into diamond shape, as shown in Fig. 3, and are slit from their acute angles nearly to their centers, so as to form four prongs. The four prongs are then bent at the inner ends of the slits, the two prongs at each end of the diamond-shaped blank being bent from each other at an angle, so that the two prongs upon each side may be parallel with each other, and at an angle with the body or middle part of the plate, as shown in Fig. 2.

The barbs, at suitable distances apart, may be twisted into a two-strand wire cord, B, as shown in Figs. 1 and 2.

With this construction, the peculiar shape of the barb A keeps it in place in the cord B, and prevents it from being pushed out or worked out by the vibrations of the wire.

What I claim as my invention is—

The barbs A, formed by cutting thin sheet metal into diamond form, slitting them from the acute angles nearly to the centers, and bending the prongs at each end at an angle with each other, to adapt them to be twisted into a two-strand wire cord, substantially as specified.

HENRY N. FRENTRESS.

Witnesses:

C. S. BURT,

R. E. ODELL.